March 12, 1957  F. W. PROGNER, JR  2,785,247
SPEED SIGNAL MEANS
Filed Nov. 14, 1952
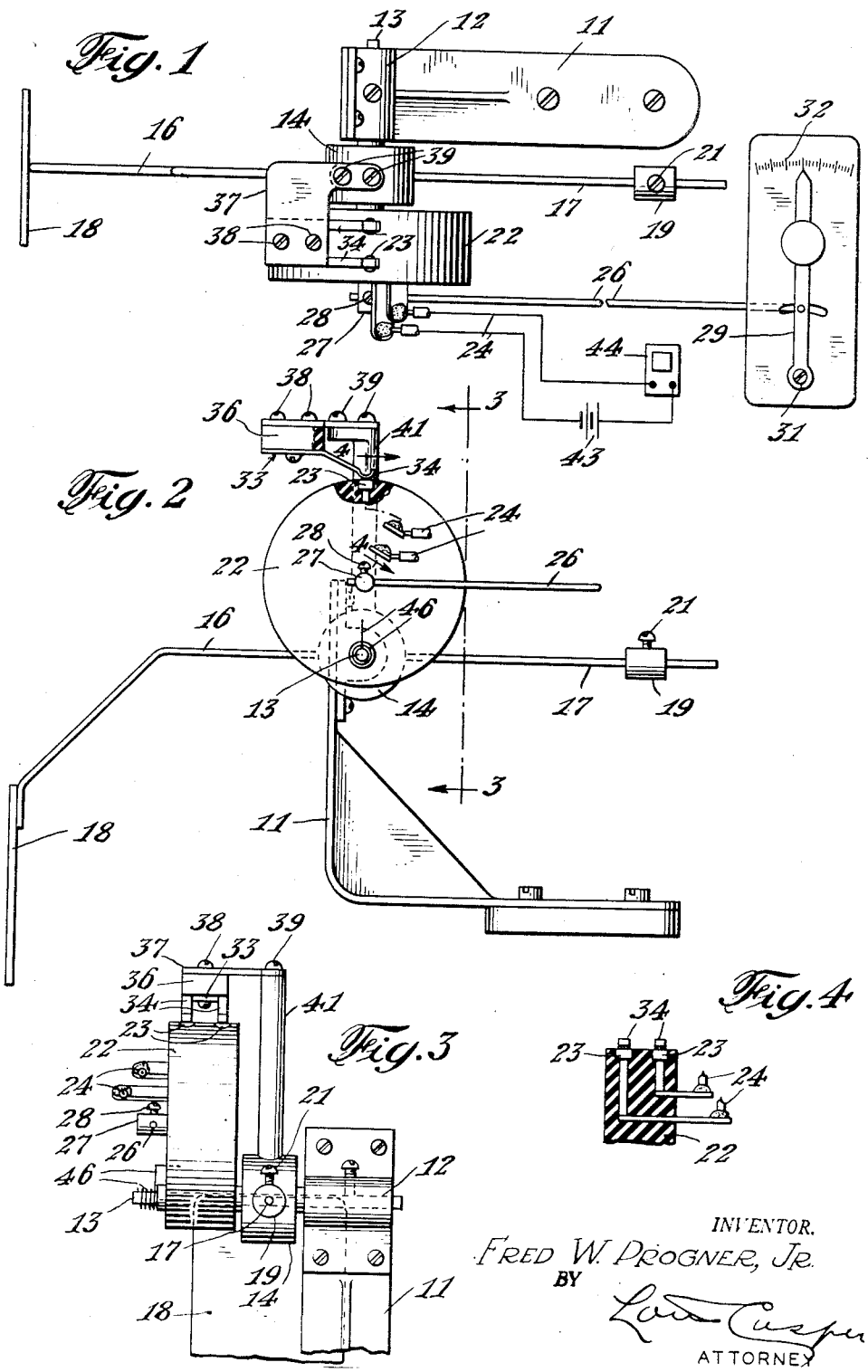
INVENTOR.
FRED W. PROGNER, JR.
BY
ATTORNEY United States Patent Office 2,785,247
Patented Mar. 12, 1957

2,785,247
SPEED SIGNAL MEANS
Fred W. Progner, Jr., Ardsley, N. Y.
Application November 14, 1952, Serial No. 320,527
1 Claim. (Cl. 200—81.9)

This invention relates primarily to speed signaling devices and more particularly to a novel and improved arrangement for signaling the operator of a moving vehicle, such as an airplane, boat, motorcar, etc., when a predetermined or selected speed is attained.

Most highways at the present time have certain definite speed regulations, and with modern motor vehicles capable of high speed the driver may, due to fatigue or being unaware of his speed, or other reasons, unintentionally exceed the speed limit. As excessive speed on the highways is the cause of a great number of accidents, the penalties for speeding are becoming more severe. Thus it is important that the driver of a vehicle be appraised, preferably by an audible device, when he is approaching or has reached the speed limit of a given highway.

In the case of airplanes, for example, it is highly desirable that the pilot be appraised when his air speed has decreased to near the stalling speed of the craft. Also, in seacraft, of naval character for example, it is helpful in maintaining uniform maneuvering speed for the pilot to be informed when a certain speed is reached or approached.

In view of the above, it is one of the primary objects of the present invention to provide a speed signaling device of novel and improved design that is easily and cheaply manufactured, for example, by the use of plastics in a number of the parts thereof, reliable and accurate in operation, and which is easily adaptable for convenient location on a plane, seacraft or motor vehicle.

Another object of the present invention resides in its simplicity and its ease of adaptability to appraise, in the case of an aircraft, the pilot when the speed of the craft is decreasing toward or reaches a minimum, and in the case of a motor vehicle to appraise the driver when the speed is increasing toward or reaches a maximum.

Still another object of the present invention resides in the ease with which the device may be adjusted or adapted to appraise the operation of a craft when the craft is approaching or has reached certain different maximum or minimum speeds. For example, in the case of a motor vehicle the device may be easily set to appraise the driver when the vehicle speed reaches or approaches forty miles an hour for one highway or set of conditions, or when the speed approaches fifty miles an hour on another highway.

The above and further objects of the invention will be more apparent in the following detailed description wherein reference is made to the accompanying drawings illustrating one embodiment of the invention.

In the drawings:
Fig. 1 is a plan view of the device of the present invention together with a diagrammatic representation of the control therefor and alarm device operated thereby;
Fig. 2 is an elevational view, with certain parts broken away, of the device of Fig. 1;
Fig. 3 is a sectional view taken on line 3—3 of Fig. 2; and
Fig. 4 is a fragmentary sectional view taken on line 4—4 of Fig. 2.

Although the present invention is hereinafter described in detail as it would be applied to and used in conjunction with the operation of an airplane by way of example for illustrative purposes, it should be kept in mind that the invention is equally well applicable to other moving objects such as boats, automobiles, trucks, etc. Fundamentally, the device of the present invention includes or consists of two sections or parts. The first part consists of the unit responding to the wind pressure created by movement of the vehicle upon which the invention is employed, and the second part includes an alarm device such as a buzzer, bell, or other audible and/or visual device which is operable by the wind actuated unit. The second unit also includes an adjusting means for adapting the wind actuated unit to render the alarm device operable for different speeds of the vehicle.

The wind actuated device is located, in the case of an airplane, someplace where it will not be affected by the wind created by the propeller but where the wind acting upon it will be primarily dependent upon the speed that the plane is traveling through the air. In the case of an automobile or other such road vehicle, the device might preferably be located under the hood and in the path of the air current created by the cooling fan since the speed of the engine and the speed of the fan and the air current developed thereby are directly proportional to the speed at which the vehicle is traveling. Thus the device would operate accurately whether the vehicle is traveling with or against a natural wind or air movement.

The second unit would be located in the pilot's cabin of an airplane or in the cab of a truck; for example, with the adjustable device conveniently positioned so that the operator of the craft or vehicle could adjust the same as desired. The two units are interconnected by electrical circuits and an operating control which can be any of the well known types, such as a Bowden wire.

Referring now to the drawings, the mounting bracket 11 of suitable design for attachment to the desired location on the craft or vehicle to which the device is applied includes a support 12 in which is mounted a rod or shaft 13. Pivotally supported on the shaft 13 is a hub 14 which has leftwardly and rightwardly extending rods 16 and 17, respectively. In the normal position of the device the rods 16 and 17, which are diametrically opposite one another on the hub 14, are substantially horizontal. The rod 16 carries at its free end a vane 18 which is substantially at right angles to the rod 16 and against which the wind created by movement of the device presses. Thus in the normal position of the device the direction of the wind is substantially normal to the forward surface of the vane 18. The rightwardly extending rod 17 has adjustably secured thereto a counterweight 19 which by movement to and fro along the rod is adapted to balance the vane 18 and retain the rods 16 and 17 substantially horizontal in their normal position. The counterweight 19 may be locked in position on the rod 17 by means of a locking screw 21.

Also pivotally mounted on the shaft 13 with the hub 14 is a circular member 22 of insulating material which carries in the upper section thereof a pair of electrical contacts 23 insulatively separated from one another and electrically connected to electrical conductors 24.

For reasons hereinafter explained and/or obvious, the contacts 23 are at a point the greatest distance from the pivot point of the member 22. These contacts may be raised slightly from the periphery of the member 22 or flush, as shown.

The member 22 is adapted to be manually rotated within limits about the shaft 13 and to this end is provided with a member 26 secured in a pivotable hub 27 extending out of the forward side of the member 22. One end of the member 26 is secured to the hub 27 by means of a screw 28, and the other end of member 26 is connected to an operating lever such as 29 in the cockpit of the plane, and through adjustment of the lever 29 the rotative position of the member 22 is changed. The connecting member 26 may be of any well known type such as a Bowden wire similar to that employed in certain controls in the conventional automobile. The operating lever 29 is pivoted at its lower end on a pivot 31 and the upper end thereof registers with a scale 32 whereby the adjusted position of the operating lever is indicated.

In operative relation with the contacts 23 and positioned thereabove is a spring member 33 with rightwardly extending arms 34 with turned up ends adapted to engage the contacts 23. The spring member 33 is supported on the underside of an insulating block 36 which in turn is attached to a plate 37 by screws such as 38. The plate 37 is secured by screws 39 to a leftwardly extending arm of a rod 41. The rod 41 extends axially from the hub 14 and accordingly moves therewith, and during such movement the spring member 33 moves in an arc about the shaft 13.

In employing the device of the present invention, the pilot of an airplane, for example, would set the operating lever 29 to a position determined by experimentation or otherwise at some speed representing or approaching the stalling speed of the aircraft, and this would cause rotation of the member 22 in a clockwise direction so as to move the contacts 23 to some position to the right and somewhat below spring member 33. After the plane took off and attained flying speed, the pressure of the wind against the vane 18 would rotate the collar 14 with its attached elements in a counterclockwise direction whereby the contacts 23 are placed in some position to the left of the turned up ends of the spring member 33. As the speed of the airplane decreases, the pressure of the wind on the vane 18 correspondingly decreases and permits the counterweight 19 to rotate the collar 14 and its attached elements in a clockwise direction. If the plane speed decreases sufficiently, the spring member 33 will ultimately reach the contacts 23, depending upon the setting of the member 22, and thereby establish an electrical circuit from one of these contacts to the other. The contacts 23 are connected by conductor 24 to a series arrangement of a battery 43 and an alarm device 44 preferably audible, such as a buzzer, and the shorting of the contacts 23 causes the alarm to operate. The operation of this alarm will appraise the pilot that the plane is approaching the stalling speed whereby he may take such corrective action as he deems proper. This corrective action would ordinarily be a decrease in the angle of attack of the plane or more power to the engine, thus causing an increase in the air speed. This increase in the air speed again causes rotation of the collar 14 with its attached elements in a clockwise direction to move the spring member 23 out of operative relation with the contacts 23, thus breaking the electrical circuit to the alarm 44 and causing it to cease operation. To eliminate lost motion in the connection between the operating lever 29 and the member 22, a coiled spring 46 may be employed with one end attached to the shaft 13 and the other to the member 22. The spring would tend to rotate the member in one direction and thus eliminate the lost motion.

It can thus be seen that with a device of the above described type embodying a pair of members such as the spring member 33 and the contacts 23, both movable independently of each other about a common axis, there is no engagement of the two until the desired time. This eliminates friction in the contact elements and provides positive contact in any position desired.

In the case of an automobile, the driver would cause the member 22 to be rotated to some position to the left of the ends of the spring member 33 and as the speed of the vehicle increased, the collar 14 would rotate to move the spring member into engagement with the contacts 23. In this manner the rotation of the collar 14 in a counterclockwise direction is effective to operate the alarm device at the desired time as the speed of the vehicle approaches a predetermined maximum. This is opposite to the arrangement in the use of the device in an airplane where the alarm device operates as the speed of the plane decreases to a predetermined minimum. Instead of operating an alarm when using the device in an automobile equipped with a radio, the device could for example be used with a pleasant aspect in such a manner that music, etc. would be interrupted when the vehicle exceeds a predetermined desired speed.

While the invention has been described by a single illustrative embodiment thereof, it will be obvious to those skilled in the art that numerous modifications may be made therein without departing from the spirit or essential attributes thereof, and it is desired therefore that only such limitations be placed thereon as are imposed by the appended claim.

What is claimed is:

In a device of the type described, a pivotable member having a pair of oppositely extending arms, one of said arms having a force responsive member adjacent the end thereof and the other arm having an adjustable counterweight whereby said member is adjustable to a normal position with said arms substantially horizontal, said force responsive member in the normal position of said member being below the axis of rotation thereof, means including said force responsive member for pivoting said member and arms varying amounts from said normal position proportionally to the force applied to said force responsive member, an electrical circuit, an electrical circuit controlling means carried by said pivotable member, means operative by said electrical circuit controlling means to complete said electrical circuit when said pivotable member in passing in either direction through a predetermined position by action of a force against said force responsive member, and means for varying the predetermined position of said pivotable member at which the electrical circuit controlling means carried thereby is effective on said electrical circuit to complete the same whereby said electrical circuit is completed for different forces applied to said force responsive member.

References Cited in the file of this patent
UNITED STATES PATENTS

| | | |
|---|---|---|
| 1,241,284 | Rhoades | Sept. 25, 1917 |
| 1,885,578 | Boykow | Nov. 1, 1932 |
| 1,909,107 | Kelly | May 16, 1933 |
| 2,021,516 | McGrath | Nov. 19, 1935 |
| 2,092,560 | Rundaldne | Sept. 7, 1937 |
| 2,116,912 | Richardson | May 10, 1938 |
| 2,121,651 | Claytor | June 21, 1938 |
| 2,280,494 | Kinsey et al. | Apr. 21, 1942 |
| 2,328,384 | Lacoe | Aug. 31, 1943 |
| 2,337,753 | Lacoe | Dec. 28, 1943 |
| 2,388,671 | Brewer | Nov. 13, 1945 |
| 2,526,315 | Allen et al. | Oct. 17, 1950 |